United States Patent
Kimura

[11] 4,235,520
[45] Nov. 25, 1980

[54] WIDE-ANGLE RETROFOCUS LENS SYSTEM
[75] Inventor: Tadashi Kimura, Tokyo, Japan
[73] Assignee: Olympus Optical Co., Ltd., Tokyo, Japan
[21] Appl. No.: 909,447
[22] Filed: May 25, 1978
[30] Foreign Application Priority Data Jun. 10, 1977 [JP] Japan ................... 52/67974

[51] Int. Cl.³ .............................................. G02B 13/04
[52] U.S. Cl. .................................................. 350/215
[58] Field of Search ......................................... 350/215

[56] References Cited
U.S. PATENT DOCUMENTS
| | | | |
|---|---|---|---|
| 3,955,883 | 5/1976 | Sugiyama | 350/215 |
| 4,099,850 | 7/1978 | Matsui | 350/215 |

FOREIGN PATENT DOCUMENTS
1111533  7/1968  United Kingdom ............ 350/215

*Primary Examiner*—Conrad J. Clark
*Attorney, Agent, or Firm*—Cushman, Darby & Cushman

[57] ABSTRACT

A wide-angle retrofocus lens system comprises a first lens component comprising a positive meniscus lens having its convex surface on the object side, a second lens component comprising a negative meniscus lens having its convex surface on the object side, a third lens component comprising a positive cemented lens component of a positive lens and a negative lens, a fourth lens component comprising a negative lens, a fifth lens component comprising a positive meniscus lens having its convex surface on the image side, and a sixth lens component comprising a positive lens. The system is arranged to satisfy the predetermined conditions so that, despite the use of a small number of component lenses, the overall length of the system can be made short, the back focal length long and various aberrations are well-corrected over a wide angle of image field.

7 Claims, 6 Drawing Figures

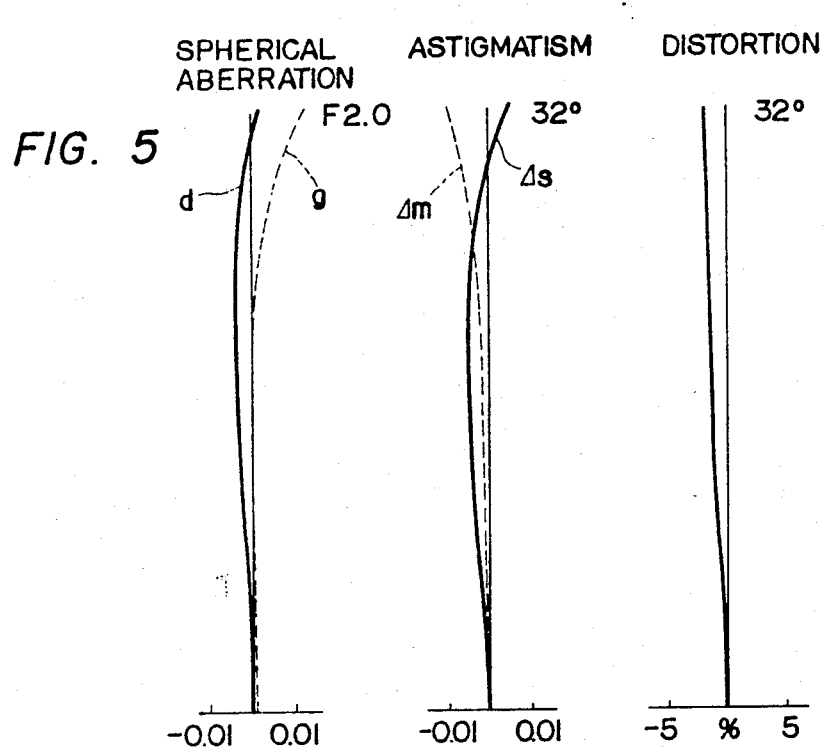
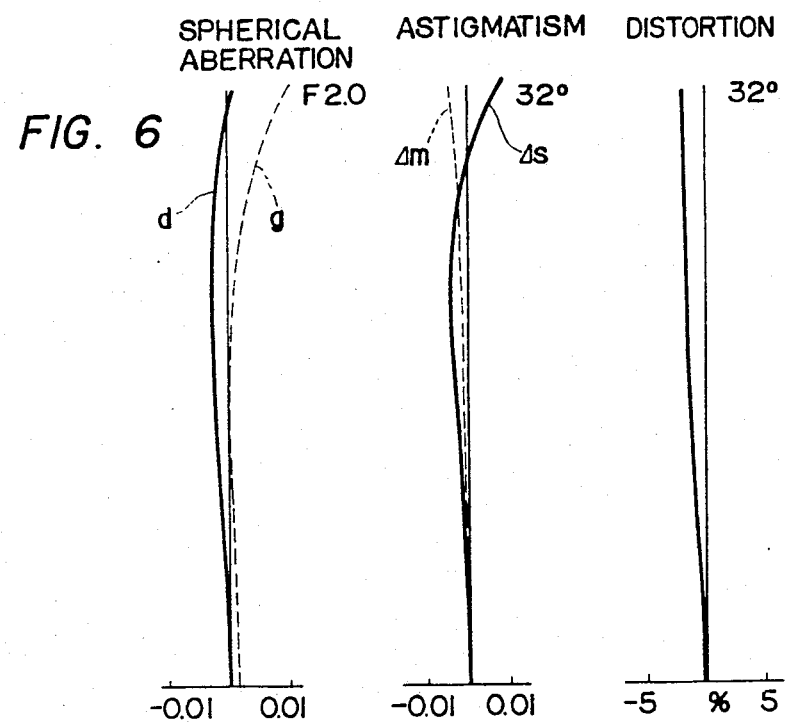

WIDE-ANGLE RETROFOCUS LENS SYSTEM

FIELD OF THE INVENTION

The present invention relates to photographic lens systems and more particularly, to a compact wide-angle retrofocus lens system.

DESCRIPTION OF THE PRIOR ART

A conventional wide angle retrofocus lens system of a class which has an equivalent focal length of 35 mm and an aperture ratio of F/2.0, having a comparatively small number of lenses and being comparatively compact with a reduced overall length of the lens system and having a long back focal length, have not been satisfactory in view of problems in correcting various aberrations. A further problem was that of correcting the curvature of field among the required corrections of the various aberrations. The reason for this is that, in the lens system of this type, when the back focal length is made long, the curvature of field becomes larger as the Petzval's sum increases, so that the quality of an image at an intermediate portion or at a peripheral portion of the image plane has been noted as being aggravated. In order to solve this problem, it was necessary for conventional lens systems to increase the number of lenses or to increase the overall length of the lens system. Thus, there was a disadvantage that such conventional lens systems could not be made sufficiently compact. There was also a problem that, when an attempt was made to correct the curvature of field, it caused the occurrence of coma flare.

SUMMARY OF THE INVENTION

It is an object of the present invention to provide a large aperture wide-angle retrofocus lens system in which the above-mentioned disadvantages are eliminated and in which, despite the use of a comparatively small number of component lenses, the overall length of the lens system can be made short, the back focal length long and various aberrations are well-corrected over a wide angle of image field.

The wide-angle retrofocus lens system according to the present invention comprises a first lens component comprising a positive meniscus lens having its convex surface on the object side, a second lens component comprising a negative meniscus lens having its convex surface on the object side, a third lens component comprising a positive cemented lens component of a positive lens and a negative lens, a fourth lens component comprising a negative lens, a fifth lens component comprising a positive meniscus lens having its convex surface on the image side, and a sixth lens component comprising a positive lens. Thus, the present lens system comprises six lens components and seven lens elements.

Further objects and advantages will be apparent in the arrangements as set forth in the following specification taken together with the accompanying drawings.

DESCRIPTION OF THE DRAWINGS

FIG. 2 through FIG. 6 show graphs illustrating conditions of aberrations of the preferred embodiments of the present invention.

DESCRIPTION OF THE PREFERRED EMBODIMENTS

Figure 1:
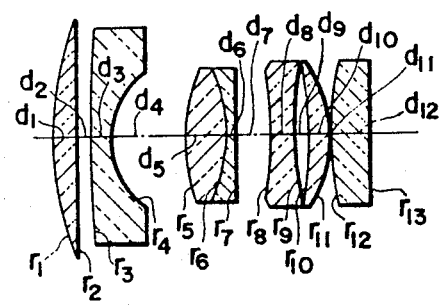
FIG. 1 shows a sectional view of a wide-angle retrofocus lens system of the present invention.
Figure 2:
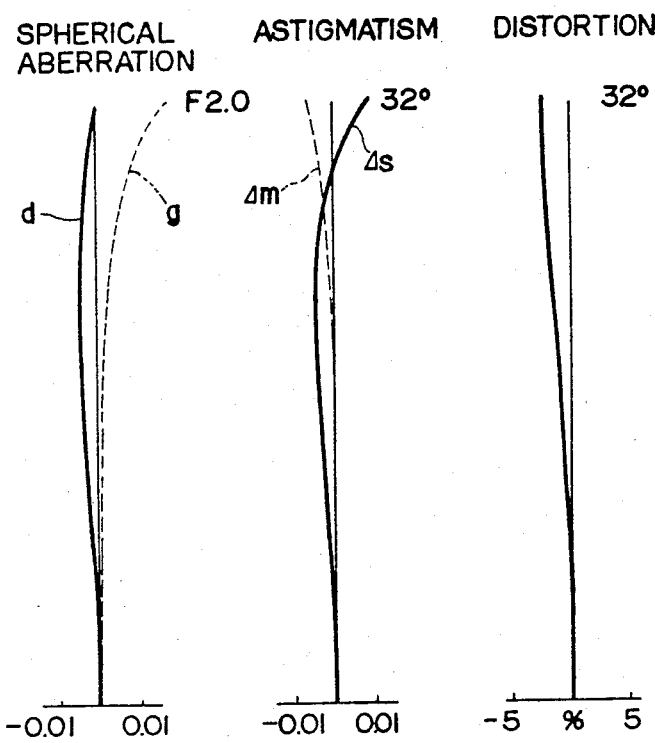
Figure 3:
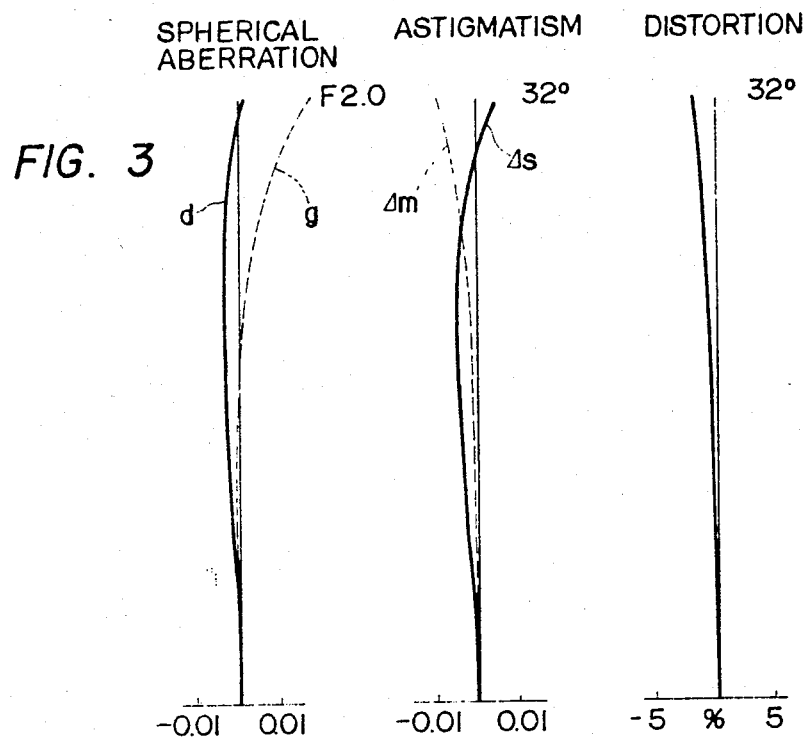
Figure 4:
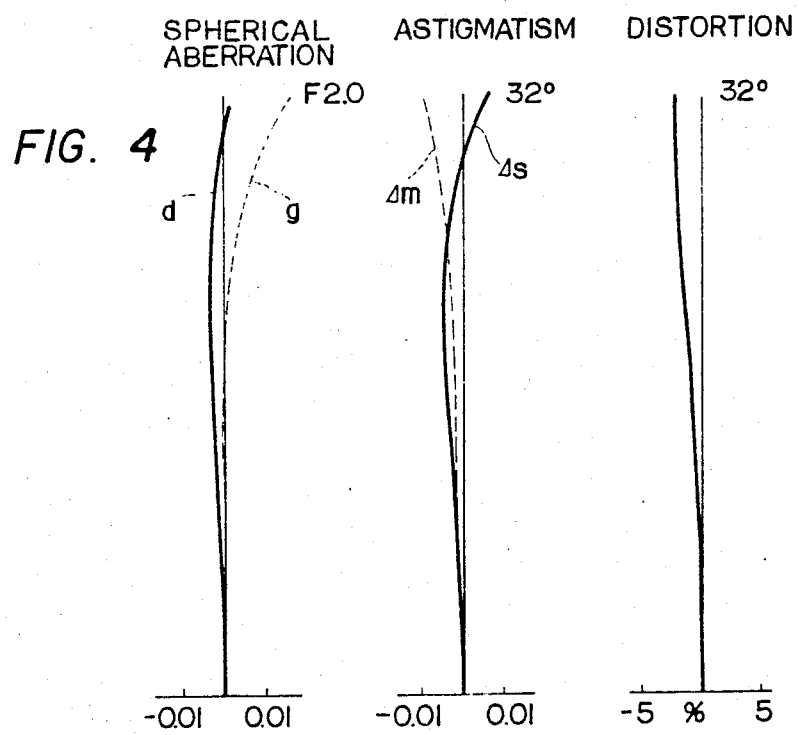

As shown in FIG. 1, in the lens system according to the present invention, a front lens group comprises a first lens component of a positive meniscus lens having its convex surface on the object side and a second lens component of a negative meniscus lens having its convex surface on the object side, and a rear lens group comprises a third lens component comprising a positive cemented lens component of a positive lens and a negative lens, a fourth lens component of a negative lens, a fifth lens component of a positive meniscus lens having its convex surface on the image side, and a sixth lens component of a positive lens. This lens system satisfies each of the conditions enumerated below:

(1) $0.35 < |f_R/f_F| < 0.8$
(2) $0.25f < d_4 < 0.5f$
(3) $|P_{45}| > 0.5/f$ wherein the reference symbol $f_F$ represents an equivalent focal length of the front divergent lens system comprising the first lens component and the second lens component, the reference symbol $f_R$ represents an equivalent focal length of the rear convergent lens system comprising the third to the sixth lens components, the reference symbol $d_4$ represents an air space between the second lens component and the third lens component, the reference symbol $P_{45}$ represents the power of the air lens to be formed between the fourth lens component and the fifth lens component, and the reference symbol $f$ represents an equivalent focal length of the total lens system.

Next, each of the above conditions which are characteristics of the present invention is hereinafter explained in detail. Under condition (1), when $|f_R/f_F|$ becomes larger than the upper limit of 0.8, the back focal length can be made longer but then it becomes impossible to sufficiently correct the various aberrations occurring from the first lens component and the second lens component by other lenses. Further, when $|f_R/f_F|$ becomes smaller than 0.35, the back focal length becomes shorter, and any attempt to make the back focal length longer results in the aggravation of the various aberrations. Also, it is undesirable in this case to try to correct them by r, d, n, etc. because then the overall balance of the aberrations is lost. Under condition (2), if the value of $d_4$ becomes larger than 0.5f, the spherical aberration is undercorrected and therefore the lens system must become undesirably large in size. Further, the back focal length becomes short and the astigmatism is overcorrected. If the value of $d_4$ becomes smaller than 0.25f, it is possible to make the back focal length longer but the spherical aberration is overcorrected and the barrel type distortion is increased. Under condition (3), when a power $|P_{45}|$ of the air lens between the fourth lens component and the fifth lens component becomes smaller than 0.5, both the lateral chromatic aberration and the longitudinal chromatic aberration are overcorrected. If they were attempted to be corrected by other means, either the lateral chromatic aberration or the longitudinal chromatic aberration is undercorrected.

Any lens system which satisfies each of the conditions explained hereinabove constitutes a lens system which can achieve the object of the present invention. However, if the system is arranged to further satisfy each of the undermentioned conditions, it is possible to obtain improved results in correcting curvature of field and various aberrations. Such conditions are:

(4) $r_4 < 0.4f$
(5) $n_2 < 1.53$
(6) $0.1f < d_7 < 0.2f$
(7) $n_3 > n_4$ wherein the reference symbol $r_4$ represents radius of curvature of the surface on the image side of the second lens component, the reference symbol $d_7$ represents an air space between the third lens component and the fourth lens component, and the reference symbols $n_2$, $n_3$ and $n_4$ represent refractive indices of the second lens component and both the lenses of the third lens component, respectively.

Among these conditions, under condition (4), when the value of $r_4$ becomes larger than $0.4f$, the Petzval's sum becomes large in its negative value and thus the curvature of field increases. Also, the spherical aberration is undercorrected and flare becomes large. Under condition (5), when the value of $n_2$ becomes larger than 1.53, the Petzval's sum becomes large in its positive value and thus the curvature of field increases. Under condition (6), if the value $d_7$ becomes smaller than $0.1f$, barrel type distortion becomes large and, if the same becomes larger than $0.2f$, the distortion is well-corrected but the coma flare is increased, causing the occurrence of an undesirable annular blur to the out-of-focus image. Under condition (7), if this condition becomes $n_3 < n_4$, both the spherical aberration and the astigmatism are undercorrected.

In addition to the above conditions (1) to (7), it is desirable for a further improved lens system to satisfy the following conditions (8) to (10):

(8) $2.0f < r_2$
(9) $1.0f < r_9$
(10) $r_6 < 0$ wherein the reference symbols $r_2$, $r_6$ and $r_9$ represent radii of curvature of the surface on the image side of the first lens component, the cemented surface of the third lens component and the surface on the image side of the fourth lens component, respectively.

Under condition (8) among these conditions, if the value of $r_2$ becomes smaller than $2.0f$, the barrel type distortion becomes large and, under condition (9), if the value of $r_9$ becomes smaller than $1.0f$, the barrel type distortion becomes large and the spherical aberration is overcorrected, so that the flare becomes large. Under condition (10), if the condition is $r_6 > 0$, both the spherical aberration and the astigmatism become undercorrected.

Herein below are given some preferred embodiments of the present invention relating to a compact wide-angle retrofocus lens system:

Embodiment 1

$r_1 = 1.548$
  $d_1 = 0.109$   $n_1 = 1.8044$   $\nu_1 = 39.62$
$r_2 = 16.750$
  $d_2 = 0.078$
$r_3 = 11.045$
  $d_3 = 0.086$   $n_2 = 1.51633$   $\nu_2 = 64.15$
$r_4 = 0.378$
  $d_4 = 0.380$
$r_5 = 1.058$
  $d_5 = 0.208$   $n_3 = 1.79952$   $\nu_3 = 42.24$
$r_6 = -0.543$
  $d_6 = 0.032$   $n_4 = 1.68893$   $\nu_4 = 31.08$
$r_7 = 9.666$
  $d_7 = 0.169$
$r_8 = -2.241$
  $d_8 = 0.109$   $n_5 = 1.78472$   $\nu_5 = 25.71$
$r_9 = 1.498$
  $d_9 = 0.067$
$r_{10} = -1.715$
  $d_{10} = 0.097$   $n_6 = 1.72916$   $\nu_6 = 54.68$
$r_{11} = -0.608$
  $d_{11} = 0.003$
$r_{12} = 1.515$
  $d_{12} = 0.210$   $n_7 = 1.6968$   $\nu_7 = 55.52$
$r_{13} = -6.083$ $f = 1.0$, $f_B = 1.089$, $\omega = 32°$, F/2.0
$f_F = -1.398$, $f_R = 0.858$, $|f_R/f_F| = 0.614$
$P_{45} = -0.927$

Embodiment 2

$r_1 = 1.038$
  $d_1 = 0.162$   $n_1 = 1.8044$   $\nu_1 = 39.62$
$r_2 = 2.323$
  $d_2 = 0.095$
$r_3 = 1.972$
  $d_3 = 0.046$   $n_2 = 1.50137$   $\nu_2 = 56.40$
$r_4 = 0.345$
  $d_4 = 0.321$
$r_5 = 1.413$
  $d_5 = 0.258$   $n_3 = 1.8044$   $\nu_3 = 39.62$
$r_6 = -0.382$
  $d_6 = 0.046$   $n_4 = 1.68893$   $\nu_4 = 31.08$
$r_7 = -5.469$
  $d_7 = 0.134$
$r_8 = -0.743$
  $d_8 = 0.157$   $n_5 = 1.7847$   $\nu_5 = 26.22$
$r_9 = 3.627$
  $d_9 = 0.034$
$r_{10} = -1.871$
  $d_{10} = 0.080$   $n_6 = 1.757$   $\nu_6 = 47.87$
$r_{11} = -0.589$
  $d_{11} = 0.003$
$r_{12} = 3.954$
  $d_{12} = 0.082$   $n_7 = 1.697$   $\nu_7 = 48.51$
$r_{13} = -1.285$ $f = 1.0$, $f_B = 1.089$, $\omega = 32°$, F/2.0
$f_F = -1.721$, $f_R = 0.833$, $|f_R/f_F| = 0.484$
$P_{45} = -0.618$

Embodiment 3

$r_1 = 1.010$
  $d_1 = 0.152$   $n_1 = 1.8061$   $\nu_1 = 40.95$
$r_2 = 2.226$
  $d_2 = 0.102$
$r_3 = 1.700$
  $d_3 = 0.055$   $n_2 = 1.51823$   $\nu_2 = 58.96$
$r_4 = 0.341$
  $d_4 = 0.319$
$r_5 = 1.428$
  $d_5 = 0.260$   $n_3 = 1.8044$   $\nu_3 = 39.62$
$r_6 = -0.379$
  $d_6 = 0.044$   $n_4 = 1.68893$   $\nu_4 = 31.08$
$r_7 = -5.839$
  $d_7 = 0.127$
$r_8 = -0.780$
  $d_8 = 0.153$   $n_5 = 1.78472$   $\nu_5 = 25.71$
$r_9 = 3.456$
  $d_9 = 0.038$
$r_{10} = -1.871$
  $d_{10} = 0.089$   $n_6 = 1.757$   $\nu_6 = 47.87$
$r_{11} = -0.591$
  $d_{11} = 0.003$
$r_{12} = 3.513$
  $d_{12} = 0.074$   $n_7 = 1.697$   $\nu_7 = 48.51$
$r_{13} = -1.401$ $f = 1.0$, $f_B = 1.089$, $\omega = 32°$, F/2.0
$f_F = -1.739$, $f_R = 0.829$, $|f_R/f_F| = 0.477$
$P_{45} = -0.628$

Embodiment 4

| | | | |
|---|---|---|---|
| $r_1 = 0.952$ | | | |
| | $d_1 = 0.164$ | $n_1 = 1.8044$ | $\nu_1 = 39.62$ |
| $r_2 = 3.636$ | | | |
| | $d_2 = 0.035$ | | |
| $r_3 = 3.595$ | | | |
| | $d_3 = 0.051$ | $n_2 = 1.50137$ | $\nu_2 = 56.40$ |
| $r_4 = 0.337$ | | | |
| | $d_4 = 0.337$ | | |
| $r_5 = 1.628$ | | | |
| | $d_5 = 0.233$ | $n_3 = 1.8061$ | $\nu_3 = 40.95$ |
| $r_6 = -0.379$ | | | |
| | $d_6 = 0.045$ | $n_4 = 1.68893$ | $\nu_4 = 31.08$ |
| $r_7 = -17.001$ | | | |
| | $d_7 = 0.176$ | | |
| $r_8 = -1.245$ | | | |
| | $d_8 = 0.163$ | $n_5 = 1.7847$ | $\nu_5 = 26.22$ |
| $r_9 = 3.179$ | | | |
| | $d_9 = 0.042$ | | |
| $r_{10} = -2.301$ | | | |
| | $d_{10} = 0.099$ | $n_6 = 1.7432$ | $\nu_6 = 49.41$ |
| $r_{11} = -0.666$ | | | |
| | $d_{11} = 0.003$ | | |
| $r_{12} = 2.650$ | | | |
| | $d_{12} = 0.071$ | $n_7 = 1.6935$ | $\nu_7 = 53.23$ |
| $r_{13} = -1.795$ | | | |

$f = 1.0$, $f_B = 1.089$, $\omega = 32°$, F/2.0
$f_F = -1.866$, $f_R = 0.861$, $|f_R/f_F| = 0.461$
$P_{45} = -0.566$

Embodiment 5

| | | | |
|---|---|---|---|
| $r_1 = 1.119$ | | | |
| | $d_1 = 0.136$ | $n_1 = 1.8044$ | $\nu_1 = 39.62$ |
| $r_2 = 6.818$ | | | |
| | $d_2 = 0.056$ | | |
| $r_3 = 11.102$ | | | |
| | $d_3 = 0.068$ | $n_2 = 1.50137$ | $\nu_2 = 56.40$ |
| $r_4 = 0.351$ | | | |
| | $d_4 = 0.329$ | | |
| $r_5 = 1.421$ | | | |
| | $d_5 = 0.264$ | $n_3 = 1.8061$ | $\nu_3 = 40.95$ |
| $r_6 = -0.402$ | | | |
| | $d_6 = 0.029$ | $n_4 = 1.68893$ | $\nu_4 = 31.08$ |
| $r_7 = -15.244$ | | | |
| | $d_7 = 0.168$ | | |
| $r_8 = -1.537$ | | | |
| | $d_8 = 0.121$ | $n_5 = 1.78472$ | $\nu_5 = 25.71$ |
| $r_9 = 2.106$ | | | |
| | $d_9 = 0.075$ | | |
| $r_{10} = -1.418$ | | | |
| | $d_{10} = 0.089$ | $n_6 = 1.734$ | $\nu_6 = 51.45$ |
| $r_{11} = -0.614$ | | | |
| | $d_{11} = 0.003$ | | |
| $r_{12} = 1.980$ | | | |
| | $d_{12} = 0.081$ | $n_7 = 1.6968$ | $\nu_7 = 55.52$ |
| $r_{13} = -2.178$ | | | |

$f = 1.0$, $f_B = 1.089$, $\omega = 32°$, F/2.0
$f_F = -1.638$, $f_R = 0.853$, $|f_R/f_F| = 0.521$
$P_{45} = -0.876$ wherein the reference symbols $r_1$ through $r_{13}$ represent radii of cuvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $\nu_1$ through $\nu_7$ represent Abbe's numbers of the respective lens elements and $f_B$ represents a back focal length.

I claim:

1. A wide-angle retrofocus lens system comprising a front lens group with a first lens component comprising a positive meniscus lens having its convex surface on the object side and a second lens component comprising a negative meniscus lens having its convex surface on the object side and a rear lens group with a third lens component comprising a positive cemented lens component of a positive lens and a negative lens, a fourth lens component comprising a negative lens, a fifth lens component comprising a positive meniscus lens having its convex surface on the image side, and a sixth lens component comprising a positive lens, and said lens system satisfying the following conditions:

(1) $0.35 < |f_R/f_F| < 0.8$
(2) $0.25f < d_4 < 0.5f$
(3) $|P_{45}| > 0.5/f$
(4) $r_4 < 0.4f$
(5) $n_2 < 1.53$
(6) $0.1f < d_7 < 0.2f$
(7) $n_3 > n_4$ wherein the reference symbol f represents an equivalent focal length of the total lens system, the reference symbol $f_F$ represents an equivalent focal length of the front lens group, the reference symbol $f_R$ represents an equivalent focal length of the rear lens group, the reference symbol $d_4$ represents an air space between the front lens group and the rear lens group, the reference symbol $P_{45}$ represents a power of the air lens to be formed between the fourth lens component and the fifth lens component, the reference symbol $r_4$ represents radius of curvature of the surface on the image side of the second lens component, the reference symbol $d_7$ represents an air space between the third lens component and the fourth lens component, the reference symbols $n_2$, $n_3$ and $n_4$ represent refractive indices of the second lens component and both the lenses of the third lens component, respectively.

2. A wide-angle retrofocus lens system according to claim 1 satisfying the following conditions:

(8) $2.0f < r_2$
(9) $1.4f < r_9$
(10) $-0.6f < r_6 < 0$ wherein the reference symbols $r_2$, $r_6$ and $r_9$ represent radii of curvature of the surface on the image side of the first lens component, the cemented surface of the third lens component and the surface on the image side of the fourth lens component, respectively.

3. A wide-angle retrofocus lens system according to claim 2 having the following numerical data:

| | | | |
|---|---|---|---|
| $r_1 = 1.548$ | | | |
| | $d_1 = 0.109$ | $n_1 = 1.8044$ | $\nu_1 = 39.62$ |
| $r_2 = 16.750$ | | | |
| | $d_2 = 0.078$ | | |
| $r_3 = 11.045$ | | | |
| | $d_3 = 0.086$ | $n_2 = 1.51633$ | $\nu_2 = 64.15$ |
| $r_4 = 0.378$ | | | |
| | $d_4 = 0.380$ | | |
| $r_5 = 1.058$ | | | |
| | $d_5 = 0.208$ | $n_3 = 1.79952$ | $\nu_3 = 42.24$ |
| $r_6 = -0.543$ | | | |
| | $d_6 = 0.032$ | $n_4 = 1.68893$ | $\nu_4 = 31.08$ |
| $r_7 = 9.666$ | | | |
| | $d_7 = 0.169$ | | |
| $r_8 = -2.241$ | | | |
| | $d_8 = 0.109$ | $n_5 = 1.78472$ | $\nu_5 = 25.71$ |
| $r_9 = 1.498$ | | | |
| | $d_9 = 0.067$ | | |
| $r_{10} = -1.715$ | | | |
| | $d_{10} = 0.097$ | $n_6 = 1.72916$ | $\nu_6 = 54.68$ |
| $r_{11} = -0.608$ | | | |
| | $d_{11} = 0.003$ | | |
| $r_{12} = 1.515$ | | | |

-continued

| | $d_{12} = 0.210$ | $n_7 = 1.6968$ | $v_7 = 55.52$ |
|---|---|---|---|
| $r_{13} = -6.083$ | | | |
| | $f = 1.0, f_B = 1.089, \omega = 32°, F/2.0$ | | |
| | $f_F = -1.398, f_R = 0.858, |f_R/f_F| = 0.614$ | | |
| | $P_{45} = -0.927$ | | | wherein the reference symbols $r_1$ through $r_{13}$ represent radii of curvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $v_1$ through $v_7$ represent Abbe's numbers of the respective lens elements, $f_B$ represents a back focal length, the reference symbol $\omega$ represent an angle of view and the reference symbol F represents an aperture ratio.

4. A wide-angle retrofocus lens system according to claim 2 having the following numerical data:

| $r_1 = 1.038$ | | | |
|---|---|---|---|
| | $d_1 = 0.162$ | $n_1 = 1.8044$ | $v_1 = 39.62$ |
| $r_2 = 2.323$ | | | |
| | $d_2 = 0.095$ | | |
| $r_3 = 1.972$ | | | |
| | $d_3 = 0.046$ | $n_2 = 1.50137$ | $v_2 = 56.40$ |
| $r_4 = 0.345$ | | | |
| | $d_4 = 0.321$ | | |
| $r_5 = 1.413$ | | | |
| | $d_5 = 0.258$ | $n_3 = 1.8044$ | $v_3 = 39.62$ |
| $r_6 = -0.382$ | | | |
| | $d_6 = 0.046$ | $n_4 = 1.68893$ | $v_4 = 31.08$ |
| $r_7 = -5.469$ | | | |
| | $d_7 = 0.134$ | | |
| $r_8 = -0.743$ | | | |
| | $d_8 = 0.157$ | $n_5 = 1.7847$ | $v_5 = 26.22$ |
| $r_9 = 3.627$ | | | |
| | $d_9 = 0.034$ | | |
| $r_{10} = -1.871$ | | | |
| | $d_{10} = 0.080$ | $n_6 = 1.757$ | $v_6 = 47.87$ |
| $r_{11} = -0.589$ | | | |
| | $d_{11} = 0.003$ | | |
| $r_{12} = 3.954$ | | | |
| | $d_{12} = 0.082$ | $n_7 = 1.697$ | $v_7 = 48.51$ |
| $r_{13} = -1.285$ | | | |
| | $f = 1.0, f_B = 1.089, \omega = 32°, F/2.0$ | | |
| | $f_F = -1.721, f_R = 0.833, |f_R/f_F| = 0.484$ | | |
| | $P_{45} = -0.618$ | | | wherein the reference symbols $r_1$ through $r_{13}$ represent radii of curvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $v_1$ through $v_7$ represent Abbe's numbers of the respective lens elements, $f_B$ represents a back focal length, the reference symbol $\omega$ represent an angle of view and the reference symbol F represents an aperture ratio.

5. A wide-angle retrofocus lens system according to claim 2 having the following numerical data:

| $r_1 = 1.010$ | | | |
|---|---|---|---|
| | $d_1 = 0.152$ | $n_1 = 1.8061$ | $v_1 = 40.95$ |
| $r_2 = 2.226$ | | | |
| | $d_2 = 0.102$ | | |
| $r_3 = 1.700$ | | | |
| | $d_3 = 0.055$ | $n_2 = 1.51823$ | $v_2 = 58.96$ |
| $r_4 = 0.341$ | | | |
| | $d_4 = 0.319$ | | |
| $r_5 = 1.428$ | | | |
| $r_6 = -0.379$ | $d_5 = 0.260$ | $n_3 = 1.8044$ | $v_3 = 39.62$ |
| | $d_6 = 0.044$ | $n_4 = 1.68893$ | $v_4 = 31.08$ |
| $r_7 = -5.839$ | | | |
| | $d_7 = 0.127$ | | |
| $r_8 = -0.780$ | | | |
| | $d_8 = 0.153$ | $n_5 = 1.78472$ | $v_5 = 25.71$ |
| $r_9 = 3.456$ | | | |
| | $d_9 = 0.038$ | | |
| $r_{10} = -1.871$ | | | |
| | $d_{10} = 0.089$ | $n_6 = 1.757$ | $v_6 = 47.87$ |
| $r_{11} = -0.591$ | | | |
| | $d_{11} = 0.003$ | | |
| $r_{12} = 3.513$ | | | |
| | $d_{12} = 0.074$ | $n_7 = 1.697$ | $v_7 = 48.51$ |
| $r_{13} = -1.401$ | | | |
| | $f = 1.0, f_B = 1.089, \omega = 32°, F/2.0$ | | |
| | $f_F = -1.739, f_R = 0.829, |f_R/f_F| = 0.477$ | | |
| | $P_{45} = -0.628$ | | | wherein the reference symbols $r_1$ through $r_{13}$ represent radii of curvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $v_1$ through $v_7$ represent Abbe's numbers of the respective lens elements, $f_B$ represents a back focal length, the reference symbol $\omega$ represent an angle of view and the reference symbol F represents an aperture ratio.

6. A wide-angle retrofocus lens system according to claim 2 having the following numerical data:

| $r_1 = 0.952$ | | | |
|---|---|---|---|
| | $d_1 = 0.164$ | $n_1 = 1.8044$ | $v_1 = 39.62$ |
| $r_2 = 3.636$ | | | |
| | $d_2 = 0.035$ | | |
| $r_3 = 3.595$ | | | |
| | $d_3 = 0.051$ | $n_2 = 1.50137$ | $v_2 = 56.40$ |
| $r_4 = 0.337$ | | | |
| | $d_4 = 0.337$ | | |
| $r_5 = 1.628$ | | | |
| | $d_5 = 0.233$ | $n_3 = 1.8061$ | $v_3 = 40.95$ |
| $r_6 = -0.379$ | | | |
| | $d_6 = 0.045$ | $n_4 = 1.68893$ | $v_4 = 31.08$ |
| $r_7 = -17.001$ | | | |
| | $d_7 = 0.176$ | | |
| $r_8 = -1.245$ | | | |
| | $d_8 = 0.163$ | $n_5 = 1.7847$ | $v_5 = 26.22$ |
| $r_9 = 3.179$ | | | |
| | $d_9 = 0.042$ | | |
| $r_{10} = -2.301$ | | | |
| | $d_{10} = 0.099$ | $n_6 = 1.7432$ | $v_6 = 49.41$ |
| $r_{11} = -0.666$ | | | |
| | $d_{11} = 0.003$ | | |
| $r_{12} = 2.650$ | | | |
| | $d_{12} = 0.071$ | $n_7 = 1.6935$ | $v_7 = 53.23$ |
| $r_{13} = -1.795$ | | | |
| | $f = 1.0, f_B = 1.089, \omega = 32°, F/2.0$ | | |
| | $f_F = -1.866, f_R = 0.861, |f_R/f_F| = 0.461$ | | |
| | $P_{45} = -0.566$ | | | wherein the reference symbols $r_1$ through $r_{13}$ represent radii of curvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $v_1$ through $v_7$ represent Abbe's numbers of the respective lens elements, $f_B$ represents a back focal length, the reference symbol $\omega$ represent an angle of view and the reference symbol F represents an aperture ratio.

7. A wide-angle retrofocus lens system according to claim 2 having the following numerical data:

| | | | |
|---|---|---|---|
| $r_1 = 1.119$ | | | |
| | $d_1 = 0.136$ | $n_1 = 1.8044$ | $\nu_1 = 39.62$ |
| $r_2 = 6.818$ | | | |
| | $d_2 = 0.056$ | | |
| $r_3 = 11.102$ | | | |
| | $d_3 = 0.068$ | $n_2 = 1.50137$ | $\nu_2 = 56.40$ |
| $r_4 = 0.351$ | | | |
| | $d_4 = 0.329$ | | |
| $r_5 = 1.421$ | | | |
| | $d_5 = 0.264$ | $n_3 = 1.8061$ | $\nu_3 = 40.95$ |
| $r_6 = -0.402$ | | | |
| | $d_6 = 0.029$ | $n_4 = 1.68893$ | $\nu_4 = 31.08$ |
| $r_7 = -15.244$ | | | |
| | $d_7 = 0.168$ | | |
| $r_8 = -1.537$ | | | |
| | $d_8 = 0.121$ | $n_5 = 1.78472$ | $\nu_5 = 25.71$ |
| $r_9 = 2.106$ | | | |
| | $d_9 = 0.075$ | | |
| $r_{10} = -1.418$ | | | |
| | $d_{10} = 0.089$ | $n_6 = 1.734$ | $\nu_6 = 51.45$ |
| $r_{11} = -0.614$ | | | |
| | $d_{11} = 0.003$ | | |
| $r_{12} = 1.980$ | | | |
| | $d_{12} = 0.081$ | $n_7 = 1.6968$ | $\nu_7 = 55.52$ |
| $r_{13} = -2.178$ | | | |

$f = 1.0, f_B = 1.089, \omega = 32°, F/2.0$
$f_F = -1.638, f_R = 0.853, |f_R/f_F| = 0.521$
$P_{45} = -0.876$ wherein the reference symbols $r_1$ through $r_{13}$ represent radii of curvature on respective surfaces of the lens elements, the reference symbols $d_1$ through $d_{12}$ designate thicknesses of the respective lens elements and the air spaces therebetween, the reference symbols $n_1$ through $n_7$ denote refractive indices of the respective lens elements, the reference symbols $\nu_1$ through $\nu_7$ represent Abbe's numbers of the respective lens elements, $f_B$ represents a back focal length, the reference symbol $\omega$ represent an angle of view and the reference symbol F represents an aperture ratio.

* * * * *